United States Patent
Li et al.

(10) Patent No.: US 10,645,711 B2
(45) Date of Patent: May 5, 2020

(54) MULTI-USER DATA TRANSMISSION METHOD AND DEVICE

(71) Applicant: Samsung Electronics Co., Ltd., Gyeonggi-do (KR)

(72) Inventors: Yingyang Li, Beijing (CN); Chengjun Sun, Beijing (CN)

(73) Assignee: Samsung Electronics Co., Ltd. (KR)

( * ) Notice: Subject to any disclaimer, the term of this patent is extended or adjusted under 35 U.S.C. 154(b) by 214 days.

(21) Appl. No.: 15/745,623

(22) PCT Filed: Jul. 20, 2016

(86) PCT No.: PCT/KR2016/007901
§ 371 (c)(1),
(2) Date: Jan. 17, 2018

(87) PCT Pub. No.: WO2017/014556
PCT Pub. Date: Jan. 26, 2017

(65) Prior Publication Data
US 2018/0220433 A1 Aug. 2, 2018

(30) Foreign Application Priority Data

Jul. 20, 2015 (CN) .......................... 2015 1 0426822

(51) Int. Cl.
*H04W 72/12* (2009.01)
*H04W 72/04* (2009.01)
(Continued)

(52) U.S. Cl.
CPC .......... *H04W 72/12* (2013.01); *H04B 7/0452* (2013.01); *H04B 7/0626* (2013.01);
(Continued)

(58) Field of Classification Search
None
See application file for complete search history.

(56) References Cited

U.S. PATENT DOCUMENTS 10,003,486 B2 * 6/2018 Zhu ..................... H04L 27/2627
10,362,596 B2 * 7/2019 You .......................... H04L 5/14
(Continued)

FOREIGN PATENT DOCUMENTS

JP            201541941           3/2015

OTHER PUBLICATIONS

PCT/ISA/210 Search Report issued on PCT/KR2016/007901 (pp. 4).

(Continued)

*Primary Examiner* — Steve R Young
(74) *Attorney, Agent, or Firm* — The Farrell Law Firm, P.C.

(57) ABSTRACT

The present application discloses a multi-user data transmission method, comprising: by a target UE, receiving a CSI-RS configuration signaling from a base station and correspondingly measuring and reporting CSI information; by said target UE, receiving a scheduling signaling from the base station and correspondingly receiving a downlink data; and by said target UE, decoding, according to acquired control information of each interfering UE of a plurality of UEs other than said target UE, data of said each interfering UE, and decoding the downlink data of said target UE according to the decoding result of said each interfering UE. With the method of the present invention, the data transmission of multi-user multiplexing based on power domain can be effectively supported, and the system performance can be optimized.

14 Claims, 3 Drawing Sheets

(51) Int. Cl.
  *H04L 1/18* (2006.01)
  *H04B 7/0452* (2017.01)
  *H04W 72/08* (2009.01)
  *H04B 7/06* (2006.01)
  *H04L 1/00* (2006.01)
  *H04L 1/06* (2006.01)
  *H04L 5/00* (2006.01)

(52) U.S. Cl.
  CPC .......... *H04L 1/0035* (2013.01); *H04L 1/1861* (2013.01); *H04W 72/042* (2013.01); *H04W 72/082* (2013.01); *H04L 1/06* (2013.01); *H04L 5/0091* (2013.01); *Y02D 70/00* (2018.01); *Y02D 70/1262* (2018.01); *Y02D 70/444* (2018.01)

(56) References Cited

U.S. PATENT DOCUMENTS

| | | | |
|---|---|---|---|
| 2016/0119807 A1* | 4/2016 | Sun | H04L 1/0029 370/252 |
| 2016/0205695 A1 | 7/2016 | Kishiyama et al. | |
| 2016/0262165 A1* | 9/2016 | Lee | H04W 72/082 |
| 2016/0285525 A1* | 9/2016 | Budianu | H04L 1/0029 |
| 2017/0346598 A1* | 11/2017 | Robert Safavi | H04J 11/0043 |
| 2018/0069651 A1* | 3/2018 | Davydov | H04L 1/0001 |
| 2018/0279365 A1* | 9/2018 | Wang | H04W 16/14 |

OTHER PUBLICATIONS

PCT/ISA/237 Written Opinion issued on PCT/KR2016/007901 (pp. 8).

3GPP TSG RAN WG1 Meeting #81, Fukuoka, Japan, May 25-29, 2015, NTT DOCOMO, Evaluation methodologies for downlink multiuser superposition transmissions, pp. 9.

3GPP TSG RAN WG1 Meetir #81, Fukuoka, Japan, May 25-29, 2015, Institute for Information Industry (III), Discussion on Possible PDCCH Modification for Downlink MUST, pp. 5.

3GPP TSG RAN WG1 Meeting #81, Fukuoka, Japan, May 25-29, 2015, Intel Corporation, Discussion on downlink multiuser superposition schemes, pp. 5.

3GPP TSG RAN WG1 Meeting #81, Fukuoka, Japan, May 25-29, 2015, Alcatel-Lucent Shanghai Bell, Alcatel-Lucent, Overview of Downlink multiuser superposition schemes, pp. 6.

* cited by examiner

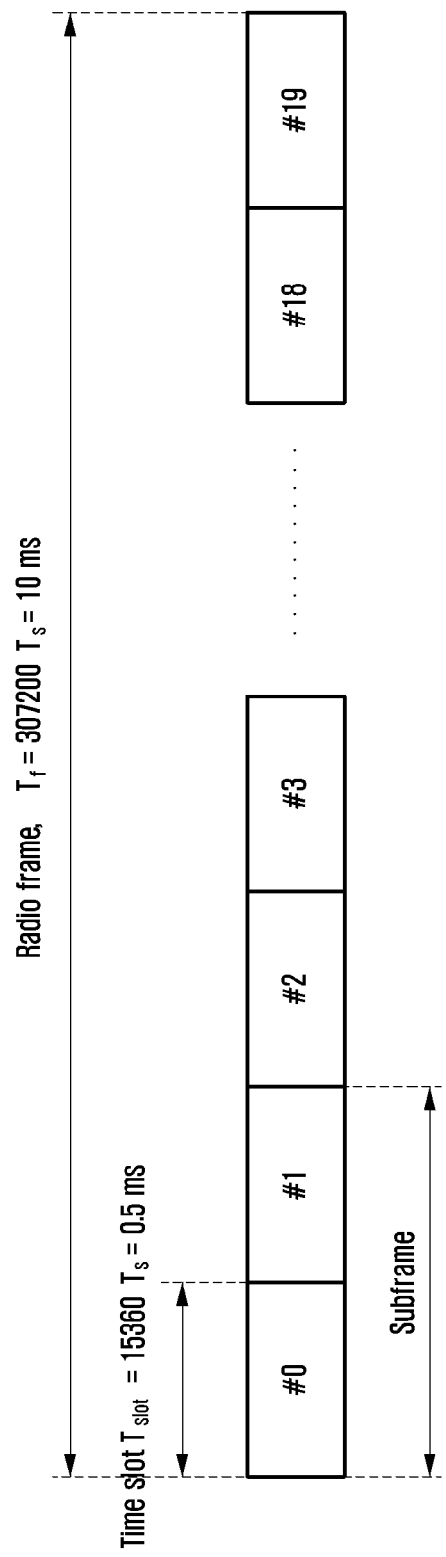
[Fig. 1]

[Fig. 2]
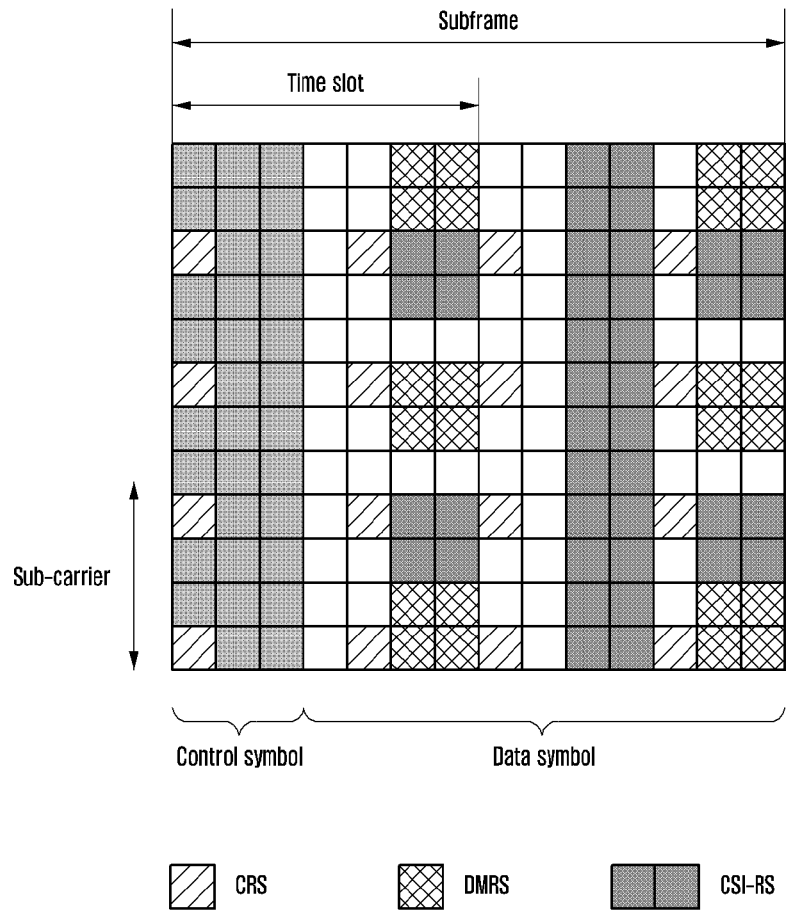
[Fig. 3]
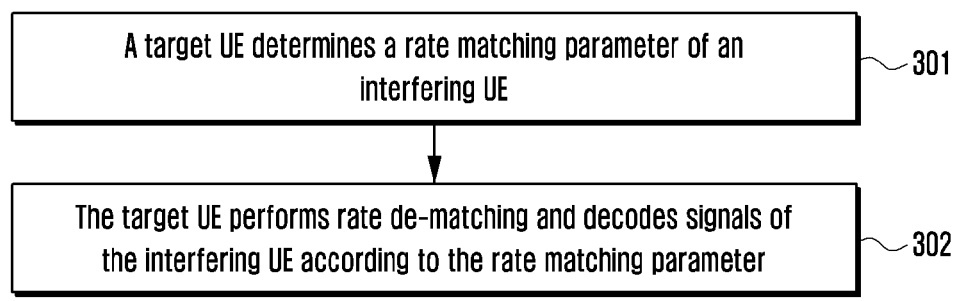
[Fig. 4]
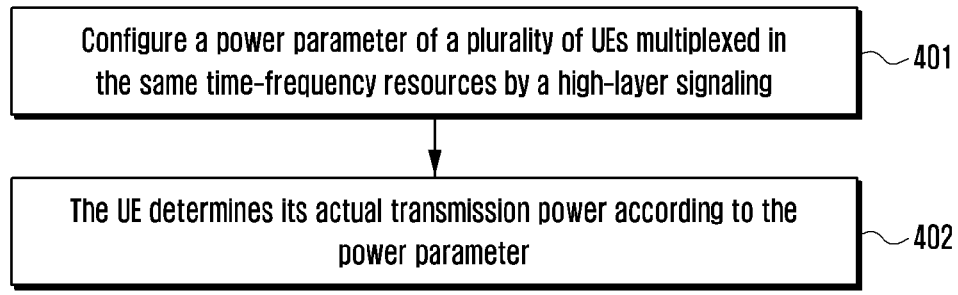

[Fig. 5]
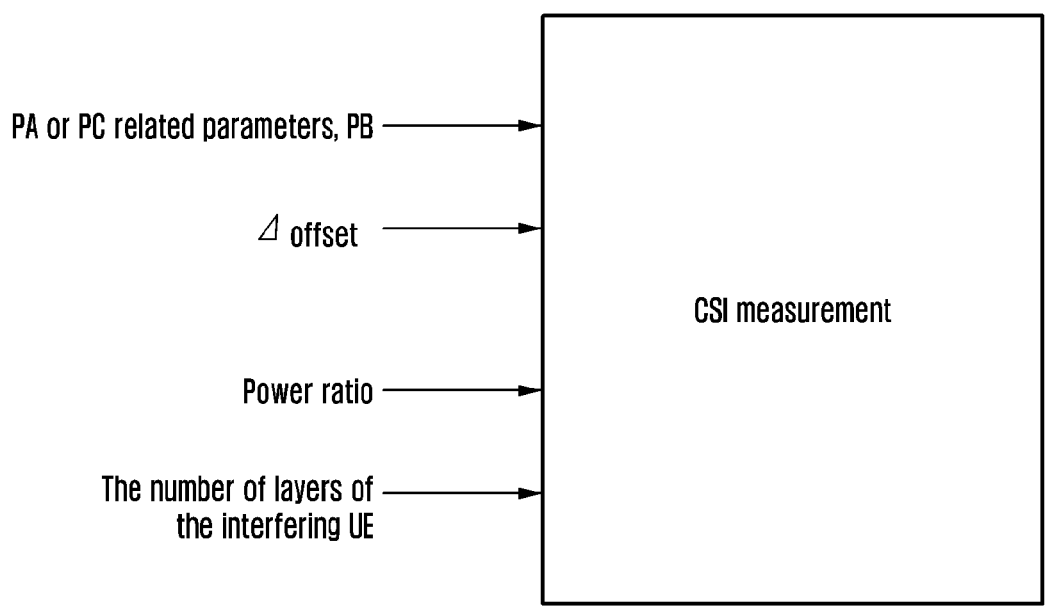
[Fig. 6]
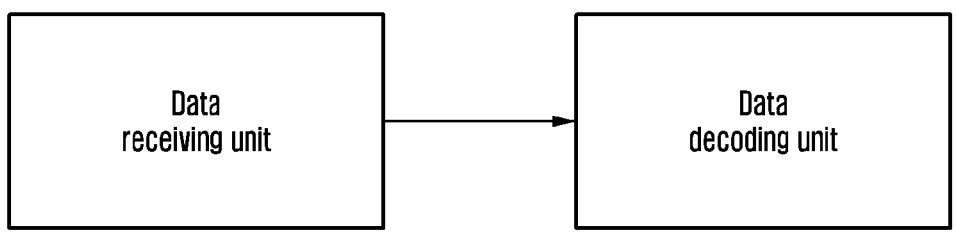

MULTI-USER DATA TRANSMISSION METHOD AND DEVICE

PRIORITY

This application is a National Phase Entry of PCT International Application No. PCT/KR2016/007901 which was filed on Jul. 20, 2016, and claims priority to Chinese Patent Application No. 201510426822.0, which was filed on Jul. 20, 2015, the content of each of which is incorporated herein by reference.

TECHNICAL FIELD

The present invention relates to wireless communication systems, and in particular to a multi-user data transmission method and device by multiplexing in power domain.

BACKGROUND ART

In a long term evolution (LTE) system in the 3GPP standardization organization, each radio frame is 10 ms in length and equally divided into ten subframes. As shown in FIG. 1, taking an FDD system as an example, each radio frame is 10 ms in length and contains ten subframes each of which is 1 ms in length. Each subframe consists of two successive time slots which are 0.5 ms in length. That is, the $k^{th}$ subframe contains a time slot 2k and a time slot 2k+1. One downlink transmission time interval (TTI) is defined on one subframe.

FIG. 2 shows the structure of a downlink subframe in an LTE system. In this structure, the first n OFDM symbols (n is 1, 2 or 3) form a downlink control channel region, and are used for transmitting user downlink control information, including a physical control format indication channel (PCFICH), a physical HARQ indication channel (PHICH), and a physical downlink control channel (PDCCH); and the remaining OFDM symbols are used for transmitting a physical downlink shared channel (PDSCH) and an enhanced PDCCH (EPDCCH). A downlink physical channel is a set of a series of resource elements (REs). RE is the minimum unit of time-frequency resources, that is, in terms of frequency, it is one sub-carrier, while in terms of time, it is one OFDM symbol. The allocation granularity of physical resources is physical resource block (PRB). One PRB contains twelve successive sub-carriers in terms of frequency and corresponds to one time slot in terms of time. Two PRBs within two time slots on a same sub-carrier within one subframe are called a PRB pair. Different REs can be used for different functions, for example, cell-specific reference signal (CRS), user-specific demodulation reference signal (DMRS), and channel state indication-reference signal (CSI-RS). Specifically, in one subframe, there can be at most forty REs used for CSI-RS. The base station can configure some or all of those REs actually for CSI-RS.

Depending upon the number of antennas deployed in the base station, one, two, four or eight ports for CSI-RS can be configured. In order to determine time-frequency resources for CSI-RS resource mapping, it is necessary to indicate the period of CSI-RS, subframe offset and REs in one subframe, wherein CSI-RS subframe configuration is used for indicating the position of a subframe occupied by the CSI-RS, that is, indicating the period of CSI-RS and subframe offset; and the CSI-RS configuration is used for indicating REs occupied by the CSI-RS in one PRB.

In order to further improve the spectrum efficiency, data of a plurality of users can be multiplexed in power domain. Generally, the multiplexed users have different transmission power. In receiving data of such multiplexed users with high power, signals of users with low power can be processed by regarding them as noise, or also can be processed by other more advanced methods. In receiving data of such multiplexed users with low power, data of users with high power can be received first, and signals of users with high power are restored and deleted; and then, data of users with low power can be decoded. Here, data of a plurality of users can be multiplexed in same time, frequency and spatial resources so that users are distinguished merely depending upon different power; or, the above-mentioned time, frequency and spatial multiplexing method can be combined with power domain multiplexing to maximize the performance. How to effectively support multi-user multiplexing based on power domain is a problem to be solved.

DISCLOSURE OF INVENTION

Technical Problem

The present application provides a multi-user data transmission method and device, by which the data transmission of multi-user multiplexing based on power domain can be effectively supported, and the system performance can be optimized.

Solution to Problem

To achieve this purpose, the present application provides the following technical solutions.

A multi-user data transmission method is provided, a plurality of user equipments (UEs) perform data transmission by multiplexing in power domain, and the data transmission of a target UE of said plurality of UEs comprises:

by a target UE, receiving a scheduling signaling from a base station and correspondingly receiving a downlink data; and by said target UE, decoding, according to acquired control information of each interfering UE of said plurality of UEs other than said target UE, data of said each interfering UE in said downlink data, and decoding the downlink data of said target UE according to the decoding result of said each interfering UE.

Preferably, said control information comprises a rate matching parameter of an interfering UE.

Said target UE performs rate de-matching on each interfering UE according to the rate matching parameter, and decodes according to the rate de-matching result.

Preferably, said rate matching parameter of an interfering UE is information about transport block size (TBS) of the interfering UE.

Said target UE acquires the information about said TBS according to a modulation and coding scheme (MCS) of an interfering UE, the number of physical resource blocks (PRBs) actually occupied by a physical downlink shared channel (PDSCH) of an interfering UE, and the subframe effective length considered by an interfering UE; or said target UE acquires the information about said TBS according to an MCS of an interfering UE, the number of PRBs actually occupied by a PDSCH of an interfering UE, and a weighting factor of an interfering UE to the number of allocated PRBs.

Preferably, when determining the number of PRBs actually occupied by a PDSCH of an interfering UE, PRBs occupied by an enhanced physical downlink control channel (EPDCCH) of an interfering UE are determined not to be used for PDSCH transmission of the interfering UE.

Preferably, said target UE receives configuration information of an EPDCCH resource set of an interfering UE, and determines that all PRBs in said EPDCCH resource set are not used for PDSCH transmission of said interfering UE; and said interfering UE does not perform the PDSCH transmission on all PRBs in said EPDCCH resource set; or said target UE receives information about PRBs occupied by an EPDCCH of an interfering UE; or said target UE receives indication information about PRBs, in a downlink control indicator (DCI), which are allocated to an interfering UE but currently used for transmitting an EPDCCH.

Preferably, said rate matching parameter of an interfering UE is the total number of bits of the soft buffer of the interfering UE; and said target UE further acquires UE type in which an interfering UE currently operates, the number of layers for spatial multiplexing supported by an interfering UE and/or whether a modulation way of 256 quadrature amplitude modulation (QAM) is supported, or a parameter $K_C$ when an interfering UE performs rate matching.

Preferably, said rate matching parameter of an interfering UE is the transmission mode of the interfering UE and/or the maximum number of downlink hybrid automatic repeat request (HARD) processes used when the interfering UE performs rate matching.

Preferably, said target UE acquires said rate matching parameter, by semi-static configuration by a high-layer signaling, or by dynamic configuration by a physical-layer signaling; or said target UE acquires some parameters of said rate matching parameter, by semi-static configuration of a high-layer signaling, or by dynamic configuration of a physical-layer signaling, the remaining parameters are preset constant values; and said interfering UE sets said remaining parameters as corresponding constant values when performing rate matching; or said target UE determines that an interfering UE uses the same parameter as that used by said target UE.

Preferably, said control information comprises layer information of multi-input multi-output (MIMO) transmission of an interfering UE;

wherein, when an interfering UE uses a transmission mode based on cell-specific reference signal (CRS) demodulation, said layer information of MIMO transmission of the interfering UE comprises the number of layers of the interfering UE and a pre-coding matrix indicator (PMI) of each layer; and when the interfering UE uses a transmission mode based on user-specific demodulation reference signal (DMRS) demodulation, said parameter related to MIMO transmission of the interfering UE comprises the number of layers of the interfering UE or comprises the number of layers of the interfering UE and corresponding DMRS port information.

Preferably, when said target UE acquires layer information of MIMO transmission of an interfering UE, it is performed according to information indicated by a base station about K layers where pre-coding vectors are correspondingly equal, wherein K1 is the number of layers of said target UE, K2 is the number of layers of the interfering UE, and K1≤(min(K1,K2)).

Preferably, if there is one or two transport blocks (TBs) carried in said K layers, said layer information of MIMO transmission of the interfering UE further comprises information about the number of TBs of said interfering UE in the K layers.

Preferably, when said K layers carry two TBs, said target UE determines, according to indication of a predefined or high-layer/physical-layer signaling, a way for the interfering UE to divide the K layers.

Preferably, said target UE receives information indicated by a base station about K2 layers, when acquiring the layer information of MIMO transmission of the interfering UE.

Preferably, when an interfering UE is allowed to retransmit data, said layer information of MIMO transmission of said interfering UE further comprises the number of TBs carried in K2 layers of the interfering UE; and said target UE receives said number of TBs from a base station.

Preferably, said control information comprises a power parameter of an interfering UE.

Preferably, the way for said target UE to acquire a power parameter of an interfering UE comprises: receiving a signal power of an interfering UE indicated by a base station, and determining a power parameter of the interfering UE.

Preferably, said power parameter is the total signal power of each layer of an interfering UE, or the power of one layer of an interfering UE, or the power of one codeword of an interfering UE.

Preferably, the way for said target UE to acquire a power parameter of an interfering UE comprises: receiving a ratio of the signal power of the target UE and the signal power of an interfering UE indicated by a base station, and determining a power parameter of the interfering UE.

Preferably, said power parameter is a ratio of the total signal power of the target UE and the total signal power of the interfering UE, a ratio of the power of one layer of the target UE and the power of one layer of the interfering UE, or a ratio of the power of one layer or each layer using a same pre-coding vector.

Preferably, when said plurality of UEs perform multiplexing on the same time-frequency resources, said power parameter of an interfering UE comprises: the total power $P_{Atotal}$ of said plurality of UEs, or the total power $P_{Alayer}$ of said plurality of UEs in one layer using a same pre-coding vector, or a respective total power $P_{Anew}$ of each UE of said plurality of UEs.

preferably, before said target UE receives a scheduling signaling, this method further comprises: said target UE receives a channel state indication-reference signal (CSI-RS) configuration signaling from a base station, and correspondingly measures and reports a channel state indication (CSI) information, wherein, during the CSI measurement, said target UE determines, according to configuration information, whether the CSI measurement of the CSI process takes information of said interfering UE into account.

Preferably, it is determined whether to take information of said interfering UE into account, according to CSI measurement information of one CSI process indicated in the configuration information; or two subframe sets are configured in one CSI process, and it is determined whether to take information of the interfering UE into account according to the subframe set to which it belongs; or it is determined whether to take information of the interfering UE into account during the CSI measurement of a CSI process, according to whether a CSI report takes information about said interfering UE into account as indicated in information indicating the type of the CSI measurement.

Preferably, for a periodic CSI report, said information indicating the type of CSI measurement is semi-statically configured by a high-layer signaling; and a for non-periodic CSI report, said information indicating the type of CSI measurement is dynamically indicated in a DCI; or said information indicating the type of CSI measurement is carried in a high-layer signaling configuring a CSI process corresponding to a specified codeword of a CSI request field.

Preferably, when it is determined that the CSI measurement takes information about said interfering UE into account, said target UE determines CSI information of the target UE according to power information of said each interfering UE.

Preferably, said target UE determining the CSI information of the target UE comprises: said target UE determines a reference PDSCH power, determines a reference power of a signal of the target UE and a reference power of a signal of an interfering UE according to a reference power ratio parameter configured by a base station, and determines CSI information of the target UE.

Preferably, when said plurality of UEs use a transmission mode based on CRS demodulation, said target UE determines a reference PDSCH power of the target UE according to a power parameter and the power offset configured by a high-layer signaling; and said power parameter is the total power $P_{Atotal}$ of said plurality of UEs, the total power $P_{Alayer}$ of said plurality of UEs in one layer using a same pre-coding vector, and/or a respective total power $P_{Anew}$ of each UE of said plurality of UEs.

preferably, when said plurality of UEs use a transmission mode based on DMRS demodulation, said target UE determines a transmission power $P_{C2}$ of the target UE and of each interfering UE according to a power parameter configured by a high-layer signaling, and determines a reference PDSCH power of the target UE, wherein $P_{C2}$ is a ratio of EPRE of one RE of a reference PDSCH and EPRE of NZP CSI-RS for CSI measurement.

A multi-user data transmission device is provided, a plurality of user equipments (UEs) perform data transmission by multiplexing in power domain, and said device comprises a data receiving unit and a data decoding unit;

said data receiving unit is configured to receive a scheduling signaling from a base station, and correspondingly receive a downlink data; and said data decoding unit is configured to acquire control information of each interfering UE of said plurality of UEs other than this UE, decode data of said each interfering UE, and decode the downlink data of this UE according to the decoding result of said each interfering UE.

It can be seen from the above technical solutions that, in the present application, after a plurality of UEs perform multiplexing in power domain, a target UE acquires control information of each interfering UE, decodes data of each interfering UE, and re-codes according to the decoding result of interfering UEs and then removes signals of interfering UEs from received data, to obtain data of the target UE for decoding. In this way, the system performance can be optimized.

Advantageous Effects of Invention

It can be seen from the above technical solutions that, in the present application, after a plurality of UEs perform multiplexing in power domain, a target UE acquires control information of each interfering UE, decodes data of each interfering UE, and re-codes according to the decoding result of interfering UEs and then removes signals of interfering UEs from received data, to obtain data of the target UE for decoding. In this way, the system performance can be optimized.

BRIEF DESCRIPTION OF DRAWINGS

FIG. 1 shows a structure of an LTE FDD frame;

FIG. 2 is a structure diagram of a subframe;

FIG. 3 is a method for processing the rate matching according to the present invention;

FIG. 4 is a method for processing a transmission power of UE;

FIG. 5 is a schematic view of CSI measurement by UE; and

FIG. 6 is a schematic view of the basic structure of a multi-user transmission device according to the present application.

MODE FOR THE INVENTION

To make the objectives, technical solutions and advantages of the present application clearer, the present application will be further described in detail as below with reference to the accompanying drawings.

When data transmission in which a plurality of UEs is multiplexed in same time-frequency resources is required, one of UEs which is receiving data is referred to as a target UE, and other UEs multiplexed in this time-frequency resources are collectively referred to as interfering UEs. In this way, when the target UE is receiving data, one basic processing method is as follows: first, decoding data of the interfering UE to obtain information bits of the interfering UE; then, recoding this information bits to restore and delete signals of the interfering UE; and next, decoding data of the target UE. The decoding performance is improved. This method is particularly suitable for a case in which the power of the interfering UE is high. Here, data of a plurality of users can be multiplexed in same time, frequency and spatial resources so that users are distinguished merely depending upon different power; or, this time, frequency and spatial multiplexing method can be combined with power domain multiplexing to maximize the performance. In order to support the decoding of the interfering UE, the target UE needs to know a series of control information of the interfering UE. During CSI measurement, the UE also can take the influence of the interfering UE into account, so as to improve the accuracy of CSI measurement.

Specifically, in the most basic multi-user data transmission method of the present application, a plurality of UEs perform data transmission by multiplexing in power domain, wherein, for a target UE of the plurality of UEs, the way for it to perform data transmission includes: the target UE receives a scheduling signaling from a base station and correspondingly receives a downlink signal according to this scheduling signaling; and the target UE acquires control information of each interfering UE of the plurality of multiplexed UEs other than the target UE, decodes data of each interfering UE, and decodes the downlink data of the target UE according to the decoding result of each interfering UE. Hereinafter, the specific implementation of this process will be described in detail in Embodiments 1, 2, 3 and 4.

Further preferably, before the target UE receives a scheduling signaling, the target UE receives a CSI-RS configuration signaling from a base station, and correspondingly measures and reports CSI information so that the base station processes data sent to the target UE according to the CSI information, for example, performs modulation, coding, and/or determination of a downlink power or more. During CSI measurement, the target UE can determine, according to the configuration information, whether the CSI measurement of this CSI process takes information of an interfering UE into account. After determining that information of an interfering UE is taken into account, the target UE determines CSI information of the target UE according to the power information of each interfering UE. Hereinafter, the specific implementation of this CSI measurement will be described in detail in Embodiment 5.

Embodiment 1

According to the above analysis, in order to support the decoding of the interfering UE, the target UE needs to know a series of control information of the interfering UE. This control information can be a parameter indicating that rate matching is performed for data transmission of the interfering UE. According to the LTE standard, the size of soft buffer allocated to one transport block (TB) is represented by $N_{IR}$, and the size of soft buffer of each code block divided from the TB is represented by $N_{cb}$, then $$N_{cb} = \min\left(\left\lfloor \frac{N_{IR}}{C} \right\rfloor, K_w\right),$$

where C is the total number of code blocks divided from the TB, and $K_w$ is the total number of coding bits output by Turbo coding. If $N_{cb} < K_w$, the soft buffer size allocated to one code block can be less than the total number of coding bits output by Turbo coding, referred to as a limited buffer rate matching (LBRM).

$$N_{IR} = \left\lfloor \frac{N_{soft}}{K_C \cdot K_{MIMO} \cdot \min(M_{DL\_HARQ}, M_{limit})} \right\rfloor$$

where, $N_{soft}$ is the total number of soft buffer bits of the UE; $K_{MIMO}$ is determined according to the transmission mode (TM) of the UE in a cell where data transmission occurs; $M_{DL\_HARQ}$ is the maximum number of downlink HARQ processes of the UE in a cell where data transmission occurs; $M_{limit}$ is a constant, for example, 8; and $K_C$ is a constant related to the capability type of the UE. Thus, rate matching is performed on one code block according to the soft buffer size $N_{cb}$.

As shown in FIG. 3, in order to support the target UE to decode data of an interfering UE, the target UE needs to know all parameters by which this interfering UE performs rate matching; and then, the target UE can perform rate de-matching on information of the interfering UE based on those rate matching parameters, so that it can decode information of the interfering UE. Various parameters which influence the rate matching of the interfering UE will be described as below, respectively.

I. This parameter can be information about TBS of an interfering UE. In general, the TBS can be determined by the MCS of the interfering UE and the number of PRBs allocated to the interfering UE. In some special circumstances, for example, DwPTS, in addition to the MCS and the number of PRBs, it is also needed to know the subframe effective length considered by the interfering UE, so that the number of allocated PRBs is corrected. In an LTE system, for a complete subframe, the TBS is determined according to the MCS and the number of allocated PRBs; while for DwPTS, the TBS is determined according to the result from multiplying the number of allocated PRBs by 0.75 or 0.357 and then to the MCS. Depending upon the configuration of a high-layer signaling, some UEs can consider subframe 6 as a complete downlink subframe, that is, it contains 14 downlink OFDM symbols; while some other UEs can consider subframe 6 as a special subframe, that is, it contains less OFDM symbols. In this case, in order to be able to decode the interfering UE, the target UE requires indication information of subframe effective length considered by the interfering UE; or, a weighting factor of the interfering UE to the number of allocated PRBs can be directly indicated to the target UE. For example, the above parameters of the interfering UE can be indicated by a high-layer signaling or a physical-layer signaling; or, the target UE can consider that the interfering UE uses the same parameter as that used by the target UE; or the above parameters of the interfering UE can be predefined.

In addition, according to the LTE standard, when the uplink data is scheduled by an EPDCCH, PRBs actually used for data transmission of the UE are related to PRBs indicated in the DCI format and PRBs occupied by the EPDCCH. That is, for one UE, even if it is indicated in the DCI format that the PDSCH contains one PRB, if this PRB is currently used for carrying the EPDCCH of this UE, this PRB cannot be used for transmitting the PDSCH. When determining the TBS of the UE, such PRBs which are occupied by the EPDCCH and thus cannot be used for transmitting the PDSCH are not included in the number of allocated PRBs. In this case, in order to be able to decode the interfering UE, the target UE needs to know which PRBs are actually occupied by the interfering UE for transmitting the PDSCH. Here, there can be two ways of determining which PRBs are actually occupied by the interfering UE for transmitting the PDSCH.

First, the target UE can be informed of the configuration information of the EPDCCH resource set of the interfering UE, so that the target UE considers that all PRBs in the EPDCCH resource set are not used for data transmission of the interfering UE. For one interfering UE, the behavior of the interfering UE can be changed, that is, all PRBs in the EPDCCH resource set are not used for data transmission of the interfering UE, no matter whether they are currently actually used for carrying the EPDCCH of this UE or not. Or, the rate matching method of the interfering UE can be changed, so that data mapped on each PRB for the PDSCH indicated by the DCI is independent of PRBs which are not used for transmitting the PDSCH because of being occupied by the EPDCCH. That is, no matter whether the interfering UE transmits data on one PRB in its EPDCCH set or not, data mapped on the PRB which is indicated by its DCI and does not belong to the EPDCCH set is kept unchanged. With this method, the interfering UE is supported to transmit the PDSCH on PRBs, which do not carry the EPDCCH of the interfering UE, in its EPDCCH resource set; and the influence on the decoding of data of the interfering UE by the target UE is reduced. For example, the rate matching and physical resource mapping are processed according to the fact, which is indicated by the DCI, that all PRBs for the PDSCH can be used for data transmission. However, for one PRB for the PDSCH indicated in the DCI format, if this PRB currently carries the EPDCCH of this UE, the base station does not actually transmit downlink data mapped to this PRB.

Second, the target UE can be informed of information about PRBs occupied by the EPDCCH of the interfering UE. For example, the EPDCCH set of the interfering UE, as well as the aggregation level and the starting ECCE of the EPDCCH currently occupied, can be indicated; or, PRBs of the interfering UE, which are allocated in the DCI format but currently used for transmitting the EPDCCH, are directly indicated.

II. This parameter can be the total number $N_{soft}$ of soft buffer bits of the interfering UE or more. Different UE types have different processing capabilities. Among others, the total number $N_{soft}$ of soft buffer bits supported is different. For some specific UE types, the application of the soft buffer is related to the number of layers of spatial multiplexing supported by the UE, for example, UE type 6 or 7. For the other specific UE types, the application of the soft buffer is related to whether the UE supports 256QAM or not. Therefore, in order to be able to decode the interfering UE, the target UE needs to know information about UE type in which the interfering UE currently operates. This information can further include the number of layers of spatial multiplexing supported by the UE, whether the UE supports 256QAM or not, or more. Or, in an LTE system, this parameter $K_C$ is a parameter related to $N_{soft}$ and the number of layers of spatial multiplexing supported by the UE. The parameter $K_C$ of the interfering UE can be indicated to the target UE. For example, this parameter of the interfering UE can be indicated by a high-layer signaling or a physical-layer signaling; or, the target UE can consider that the interfering UE uses the same parameter as that used by the target UE; or this parameter of the interfering UE can be predefined.

III. This parameter can be the maximum number $M_{DL\_HARQ}$ of downlink HARQ processes used by the interfering UE during rate matching. For a plurality of UEs receiving downlink data simultaneously in one cell, the $M_{DL\_HARQ}$ they used can be different. For example, for a UE which operates in this cell only, its $M_{DL\_HARQ}$ equals to 8 for an FDD system, while for a TDD system, $M_{DL\_HARQ}$ is obtained according to the TDD uplink and downlink configuration indicated in System Information Block 1 (SIB1). When this cell is one Scell of the UE, the reference downlink HARQ timing for transmitting downlink data in the Scell also depends upon the Pcell. For example, in a case where both the Pcell and the Scell are TDD systems, the reference TDD uplink and downlink configuration can be different from the TDD uplink and downlink configuration of the Scell. When the Pcell and the Scell are a TDD cell and an FDD cell, respectively, the downlink HARQ timing of the Scell is not a function of the HARQ timing of the FDD. Because different UE have different reference downlink HARQ timings, $M_{DL\_HARQ}$ considered by different UEs are different. In this case, in order to decode the interfering UE, the target UE needs to know information about $M_{DL\_HARQ}$ of the interfering UE. For example, this parameter $M_{DL\_HARQ}$ of the interfering UE can be indicated by a high-layer signaling or a physical-layer signaling; or, the target UE can consider that the interfering UE uses the same parameter $M_{DL\_HARQ}$ as that used by the target UE; or this parameter $M_{DL\_HARQ}$ of the interfering UE can be predefined.

IV. This parameter can be the TM of the interfering UE, i.e., parameter $K_{MIMO}$. For a case where a TM supporting two TBs is configured, $K_{MIMO}$ equals to 2; and for a case where a TM supporting only one TB is configured, $K_{MIMO}$ equals to 1. In this case, in order to perform rate de-matching on the interfering UE, the target UE needs to know information about the TM of the interfering UE. For example, this parameter $K_{MIMO}$ of the interfering UE can be indicated by a high-layer signaling or a physical-layer signaling; or, the target UE can consider that the interfering UE uses the same parameter $K_{MIMO}$ as that used by the target UE; or this parameter $K_{MIMO}$ of the interfering UE can be predefined.

According to the above analysis, in order to perform rate de-matching on the interfering UE, information to be known by the target UE includes: the subframe effective length considered by the interfering UE, the weighting factor of the interfering UE to the number of allocated PRBs, $M_{DL\_HARQ}$ of the interfering UE, $K_{MIMO}$ of the interfering UE, $K_C$ of the interfering UE, or more. Here, all those parameters can be semi-statically configured by a high-layer signaling or dynamically configured by a physical-layer signaling; or, only some parameters of this information can be semi-statically configured by a high-layer signaling or dynamically configured by a physical-layer signaling, while some other parameters can be predefined as constant values; or, for at least some of those above parameters, the target UE can consider that the interfering UE uses the same values as those used by the target UE. Here, for one target UE, the selection of an interfering UE which is matched with this rate matching parameter can be implemented by the base station, so that the target UE and the interfering UE can be multiplexed; or, the rate matching method of the interfering UE can be changed, so that it considers in a way consistent to the target UE. For example, for one target UE, the $M_{DL\_HARQ}$ of an interfering UE multiplexed with the target UE is predefined as 8, that is, the target UE performs rate de-matching according to the fact that the $M_{DL\_HARQ}$ of the interfering UE is 8. In this case, the base station can be limited to select only UEs whose $M_{DL\_HARQ}$ is 8 to multiplex with the target UE; or, the rate matching method of the interfering UE can be changed, that is, process the rate matching based on the fact that $M_{DL\_HARQ}$ is 8.

Or, in order to avoid signaling overhead, the target UE can consider that the interfering UE does not execute the LBRM. In fact, for any one of UE types defined for an LTE system, when only a small TBS is scheduled, it is not required to execute the LBRM, because the UE has sufficient soft buffer. Therefore, the above multiplexing operation can be completed by the base station, that is, the TBS of the interfering UE is ensured small so that the interfering UE does not need to execute the LBRM; or, the rate matching method of the interfering UE can be changed, that is, the soft buffer is processed constantly according to the fact that $N_{cb}$ equals to $K_w$, irrelevant to the TBS.

Embodiment 2

According to the above analysis, in order to support the decoding of the interfering UE, the target UE needs to know a series of control information of the interfering UE. This control information can be a parameter related to the MIMO transmission of the interfering UE. For a TM based on CRS demodulation, the target UE needs to know the number of layers of the interfering UE and the PMI; and for the TM based on DRMS demodulation, the target UE needs to know the number of layers of the interfering UE, and further, the DMRS port information of the interfering UE. The number of layers of the target UE is represented by K1, the number of layers of the interfering UE is represented by K2, and it is assumed that the pre-coding vectors in K≤min(K1,K2) layers of the two UEs are correspondingly equal.

When information about the interfering UE is indicated, information about only above K layers where pre-coding vectors are correspondingly equal can be indicated, including the number K of layers. Other information, for example, PMI or DMRS port, can be further contained. For example, for the TM based on DMRS, when K is equal to 1, the DMRS port used for data transmission of this layer of the interfering UE is further indicated, or the DMRS port of the interfering UE is predefined, for example, DMRS port 7; and when K is greater than 1, the DMRS port of the interfering UE is predefined, for example, DMRS ports 7 and 8. For example, for the TM based on CRS, it is required to indicate the PMI for data transmission of K layers of the interfering UE. It is assumed that the power of the target UE is low while the power of the interfering UE is high, the target UE needs to decode and delete signals of the interfering UE when decoding, and assumed that K2 ≤K1 and K=min(K1, K2). With this method, it is equivalent to indicate information about all K2 layers of the interfering UE. If one or two TBs can be carried on those K layers, information about the number of TBs is also required. For a case where there are two TBs, a method of dividing K layers into two groups each being used for carrying one TB can be predefined, or a method for dividing K layers can be indicated by a high-layer signaling or a physical-layer signaling.

When information about the interfering UE is indicated, information about K2 layers of the interfering UE can be indicated, including the number of layers K2. Other information, for example, PMI or DMRS port, can be further contained. For example, for the TM based on DMRS, when K2 is equal to 1, the DMRS port used for data transmission of this layer of the interfering UE is further indicated, or the DMRS port of the interfering UE is predefined, for example, DMRS port 7; and when K2 is greater than 1, the ports of the interfering UE must be predefined as successive K2 ports starting from DMRS port 7. For example, for the TM based on CRS, it is required to indicate the PMI for data transmission of K2 layers of the interfering UE. In a case where the interfering UE is allowed to retransmit data, the number of TB s, i.e., two TBs or only one TB, carried on K2 layers also can be indicated. In the case of data re-transmission, the interfering UE can transmit data of only one TB on a plurality of layers.

Embodiment 3

According to the above analysis, in order to support the decoding of the interfering UE, the target UE needs to know a series of control information of the interfering UE. This control information can be a power parameter of the interfering UE. In addition, the indication method of the power parameter is related to the number of layers of the UEs multiplexed in the same time-frequency resources.

One method is to indicate the signal power of the target UE and the signal power of the interfering UE, respectively. This information can be semi-statically indicated by a high-layer signaling or dynamically indicated by the DCI. This power parameter can be the total power of signals of each layer of one UE. That is, the total signal power of the target UE and the total signal power of the interfering UE are configured, respectively. Or, this power parameter can be the power of one layer of the UE. That is, only the power of one layer of the target UE and the power of one layer of the interfering UE are configured, and applied to other layers. Or, this power parameter can be the power of one codeword (CW) of the UE. That is, the power of each CW of the target UE and the power of each CW of the interfering UE are configured, respectively.

Another method is to indicate a ratio of the signal power of the target UE and the signal power of the interfering UE.

The above power ratio parameter can be a ratio of the total signal power of the target UE and the total signal power of the interfering UE. For a TM based on DMRS, it is assumed that the target UE and the interfering UE share a same DMRS port, and further assumed that the sum of power of the two UEs on the data RE is equal to the power of the RE of the DMRS or meets a predefined relation. In this way, according to the total power ratio of the two UEs, a ratio of the power of the data modulation symbol of each layer of each UE and the power of the corresponding DMRS can be calculated, respectively. Specifically, a ratio of the total signal power of the target UE and the total signal power of the interfering UE is represented by $r_A$, and it is assumed that the transmission power of each layer of the UE is the same, the number of layers of the target U is K1, and the number of layers of the interfering UE is K2, then a ratio of the power of one layer of the target UE and the power of one layer of the interfering layer is $r=r_A \cdot K2/K1$. In this way, a ratio of the power of the data modulation symbol of each UE and the power of the DMRS of this layer can be calculated, respectively.

Or, this power ratio parameter can be a ratio of the power of one layer of the target UE and the power of one layer of the interfering layer, and is applied to other layers; or, a ratio of the power of one layer, using a same pre-coding vector, of the target UE and of the interfering UE can be configured, and is applied to other layers using a same pre-coding vector, and the power of other layers, using a different pre-coding vector, of the target UE and of the interfering UE is not limited. Or, a power ratio is configured, respectively, for each layer, using a same pre-coding vector, of the target UE and of the interfering UE, and the power of other layers, using a different pre-coding vector, of the target UE and of the interfering UE is not limited. For example, this method can be used in a case where a plurality of UEs multiplexed in the same time-frequency resources use the TM based on DMRS or use both the TM based on CRS and the TM based on DMRS, so that the base station can set different power for different layers according to their scheduling policies. For a TM based on DMRS, for one layer using a same pre-coding vector, it is assumed that the target UE and the interfering UE share a same DMRS port, and further assumed that the sum of power of the two UEs on the data RE is equal to the power of the RE of the DMRS or meets a predefined relation. In this way, according to the total power ratio of this layer of the two UEs, a ratio of the power of the data modulation symbol of each UE and the power of the DMRS of this layer can be calculated, respectively.

Embodiment 4

According to the above analysis, in order to support the decoding of the interfering UE, the target UE needs to know a series of control information of the interfering UE. The above control information can be a power parameter of the interfering UE. In the LTE standard, for the TM based on CRS, the EPRE of the data RE of the UE is obtained by parameters $P_A$ and $P_B$. $P_A$ is used for configuring a ratio of the data EPRE within the OFDM symbol not containing CRS and the EPRE of the CRS, and $P_B$ is used for configuring a ratio of the data EPRE within the OFDM symbol not containing CRS and the data EPRE within the OFDM symbol containing CRS. $P_B$ is a cell public parameter, that is, UEs in a same cell have a same $P_B$; and $P_A$ is configured for each UE respectively, and thus can be different for different UEs.

For one UE, by an existing method for LTE, parameter $P_A$ can be configured. When a plurality of UEs are multiplexed in the same time-frequency resources, the transmission power of each UE can be still determined according to this parameter $P_A$, respectively. With this method, the sum of EPRE of the PDSCH of each UE of one data RE varies with respect to the value range of the EPRE of the CRS. For example, in the existing LTE system, the maximum value and the minimum value of $P_A$ are 3 dB and −6 bB, respectively. After the use of this method, the maximum value and the minimum value of the sum of EPRE in the time-frequency resources in which two UEs are multiplexed are 6 bB and −3 bB, respectively.

As shown in FIG. 4, the present invention proposes that, for a case where a plurality of UEs are multiplexed in the same time-frequency resources, a new power parameter is configured by a high-layer signaling. This method can be only applied to a case where a plurality of UEs are multiplexed relying on power domain when in poor time, frequency and spatial orthogonality; or, the condition of the application of this method may not be limited. Next, the UE can determine its actual transmission power according to the above configured new power parameter. Here, the UE can determine its actual transmission power based on the above new power parameter and other parameters, for example, a ratio of power of the plurality of UEs multiplexed. The following description will be given to several possible methods.

Optionally, in a case where a plurality of UEs are multiplexed in the same time-frequency resources, for each UE, a new parameter $P_{Anew}$ can be configured by a high-layer signaling to indicate the total power of this UE, for example, a ratio of the EPRE of the PDSCH of this UE in the data RE and the EPRE of the CRS. The above parameter $P_{Anew}$ can be another parameter other than the parameter $P_{Anew}$ configured by a high-layer signaling. The value range of the above $P_{Anew}$ can be the same as that of the existing $P_A$, for example, [−6, 3] dBm. Or, the value range of $P_{Anew}$ can be adjusted according to the number of UEs that can be supported to be multiplexed in the same time-frequency resources. For example, the number of UEs multiplexed is represented by M; the value range of $P_{Anew}$ is then [−6, 3]−10·log$_{10}$(M)dBm. This parameter $P_{Anew}$ can further take the respective $P_A$ parameter of the two UEs into account. For example, $P_{Anew}$ of one UE is less than or equal to its parameter $P_A$; or, $P_{Anew}$ of one UE is less than or equal to its parameter $P_A$−10·log$_{10}$(M). Or, in a case where a plurality of UEs are multiplexed in the same time-frequency resources, a new parameter $P_{Anew}$ can be configured only when the UE serves as a UE having lower power. While for a case where the UE serves as a UE having higher power, the existing parameter $P_A$ is still used.

Optionally, in a case where a plurality of UEs are multiplexed in the same time-frequency resources, one parameter $P_{Atotal}$ can be configured by a high-layer signaling to indicate the total power of the plurality of UEs multiplexed, for example, a ratio of the sum of EPRE of the PDSCHs of the plurality of UEs multiplexed in the data RE and the EPRE of the CRS. This parameter $P_{Atotal}$ can be another parameter other than the parameter $P_A$ configured by a high-layer signaling. Based on this parameter $P_{Atotal}$, and in combination with the total power ratio of the two UEs, the transmission power of each UE can be obtained. According to this method, after the transmission power of one UE is obtained, this transmission power is equally allocated to each layer of this UE, so that the power of each layer with respect to the CRS is obtained. Based on this $P_{Atotal}$, it is assumed that a power ratio of one layer of the two UEs is further configured, the transmission power of each layer of the UE is limited to be equal to each other, the number of layers of the target UE is represented by K1, the number of layers of the interfering UE is represented by K2, and the power ratio of one layer of the target UE and the interfering layer is $P r=P_{target,layer}/P_{interference,layer}$, then the power of each layer of the interfering UE is $P_{interference,layer}=P_{Atotal}/(r·K_1+K_2)$ and the power of one layer of the target UE is $1−P_{interference,layer}$. The value range of this $P_{Atotal}$ can be the same as that of the existing $P_A$, for example, [−6, 3] dBm. Or, the value range of this parameter $P_{Atotal}$ can be determined according to the respective parameter $P_A$ of the two UEs. For example, $P_{Atotal}$ is less than or equal to the sum of $P_A$ of the two UEs, i.e., $P_{Atotal} \leq P_{A1}+P_{A2}$; or, $P_{Atotal}$ is less than or equal to the greater one of $P_A$ of the two UEs, i.e., $P_{Atotal} \leq \max(P_{A1}, P_{A2})$; or, $P_{Atotal}$ is less than or equal to the sum of $P_A$ of the two UEs and less than an upper limit $P_{Atotal,limit}$, i.e., $P_{Atotal} \leq \min(P_{A1}+P_{A2}, P_{Atotal,limit})$.

Optionally, in a case where a plurality of UEs are multiplexed in the same time-frequency resources, one parameter $P_{Alayer}$ can be configured by a high-layer signaling to indicate the total power of the plurality of UEs multiplexed in one layer using a same pre-coding vector. Based on this parameter $P_{Alayer}$, and in combination with the power ratio in one layer of the two UEs, the transmission power of each UE in this layer can be obtained. For example, the power ratio of one layer of the target UE and the interfering UE is $P r=P_{target,layer}/P_{interference,layer}$, then the power of one layer of the interfering UE is $P_{interference,layer}=P_{Alayer}/(1+r)$ and the power of one layer of the target UE is $1−P_{interference,layer}$. It is assumed that the power of each layer of each UE is same. Then the power of each layer is obtained according to this method.

For the above method, when a plurality of UEs are multiplexed in the same time-frequency resources, a new power parameter, for example, $P_{Atotal}$, $P_{Alayer}$ or $P_{Anew}$, is introduced. In this case, according to the configuration of the high-layer signaling or the indication in the DCI format, when a plurality of UEs are multiplexed in the same time-frequency resources, the UE determines the transmission power by using this new power parameter; and it is not indicated that a plurality of UEs are multiplexed in the same time-frequency resources, the UE still uses the existing parameter $P_A$ configured by the high-layer signaling.

Embodiment 5

In the LTE standard, for the TM based on CRS, the EPRE of the data RE of the UE is obtained by parameters $P_A$ and $P_B$. $P_B$ is a cell public parameter, that is, UEs in a same cell have a same $P_B$; and $P_A$ is configured for each UE respectively, and thus can be different for different UEs. The high-layer signaling further configures a parameter $\Delta_{offset}$ which is power offset from the power of the reference PDSCH determined based on $P_A$ during the CSI measurement. In this way, during the CSI measurement by the UE, the transmission power of the reference PDSCH is determined by replacing $P_A$ with a parameter $P_{A+\Delta offset}$. For a PDSCH based on DMRS transmission, the base station can flexibly set the EPRE of the data RE. However, it still needs to comply with the parameter $P_B$. The high-layer signaling further configures a parameter $P_C$ which is a ratio of the EPRE of one RE of the reference PDSCH and the EPRE of the non-zero power (NZP) CSI-RS for the CSI measurement. In this way, during the CSI measurement by the UE, the transmission power of the reference PDSCH is determined by replacing $P_A$ with the parameter $P_C$.

The above method is applied to a case where downlink data of only one UE is transmitted in one time-frequency resource or there is small interference between the UEs or no optimization is considered although a plurality of UEs are multiplexed. When a plurality of UEs are multiplexed in the same time-frequency resources and a plurality of UEs are multiplexed relying on power domain when in poor time, frequency and spatial orthogonality, during the CSI measurement, the UE can further take the influence of other UEs into account, so that the accuracy of the CSI measurement is improved.

Here, in order to support more accurate CSI measurement, the present invention proposes that the UE should take the influence of the interfering UE into account during the CSI measurement.

For a transmission mode based on CRS, on the basis of the new power parameter, for example, $P_{Atotal}$, $P_{Alayer}$ or $P_{Anew}$, introduced in the Embodiment 4, another parameter $\Delta_{offset,2}$ which is power offset used on the basis of this new power parameter during the CSI measurement can be configured; or, the existing parameter $\Delta_{offset}$ is still used. For a transmission mode based on DMRS, another parameter $P_{C2}$ which is a ratio of the EPRE of one RE of the reference PDSCH and the EPRE of the NZP CSI-RS for the CSI measurement can be configured, or the existing parameter $P_C$ is still used. Next, a reference power ratio parameter $r_{CSI}$ of the UE for the CSI measurement can be further configured. $r_{CSI}$ can be only applied to CSI measurement; or, $r_{CSI}$ can also be applied to downlink data transmission, $r_{CSI}$ can be configured by a high-layer signaling, or can also be predefined as one constant value. In this way, the power of the PDSCH of the target UE and the power of the reference PDSCH of the interfering UE can be determined according this parameter, so that a more accurate CSI can be calculated. For a UE with higher power, this reference power ratio $r_{CSI}$ limits the upper limit of the signal-to-noise ratio of this UE; for a UE with lower power, depending upon the performance of interference removal, the remaining signals of the UE with higher power still form the interference signals and limit the SNR of the UE with lower power. For example, it is assumed that $r_{CSI}$ is a ratio of the total power of the target UE and the total power of the interfering UE, for the TM based on CRS, according to the parameter $P_{Atotal}$ and the parameter $\Delta_{offset,2}$, the power of the reference PDSCH of the interfering UE is $P_{interference} = P_{Atotal}/(1+r_{CSI})$ and the power of the reference PDSCH of the target UE is $1-P_{interference}$. During the CSI measurement, information about the number of reference layers of the interfering UE can be further configured. This information can be configured by a high-layer signaling, or can also be predefined as a constant value, for example, 1.

In a present LTE system, the configuration of a plurality of CSI processes of the UE has been supported, so that the UE can measure and report CSI information of the plurality of CSI processes, respectively. The data transmission method for different CSI processes can be different, for example, coordinative scheduling (CS), joint transmission (JT), dynamic point selection (DPS) or more. In order to support a case where a plurality of UEs are multiplexed in the same time-frequency resources as described in the present invention, whether the CSI of one CSI process takes the influence of the interfering UE into account can be further configured.

For one CSI process, whether to take the influence of the power of the plurality of UEs multiplexed into account during the measurement of the CSI of this CSI process can be indicated by certain configuration information. For example, this configuration information can be the increase of 1 bit. It indicates that the CSI in this CSI process is measured according to an existing method, that is, it is assumed that no other UEs are multiplexed in the time-frequency resources or no optimization is performed on the interference between the UEs; or, it indicates that the CSI in this CSI process is measured according to this information about power allocation of the UEs multiplexed, that is, the UE can estimate the interference level from the reference PDSCH power of the interference signals. Or, explicit bits cannot be increased, and instead, the specific value of other configuration information is used for indication. For example, for one CSI process, if the above new power parameter is configured, one special value of this reference power ratio, for example, 0, can be used to indicate that the CSI measurement is performed according to an existing method, while other values of the reference power ratio still indicate the CSI measurement which needs to take the influence of the interfering UE and the value of the reference power ratio into account; or, one value of information about the number of reference layers of the interfering UE, for example, 0, can be used to indicate that the CSI measurement is performed according to an existing method, while other values of the reference number of layers still indicate the CSI measurement which needs to take the influence of the interfering UE and the value of the reference number of layers into account.

For one CSI process, it is assumed that two subframe sets are configured, and configuring different CSI measurement methods for different subframe sets can be supported. That is, distinguishing is made about whether to take the influence of the power of the plurality of UE multiplexed into account or not. For example, an existing multi-user multiplexing method is used for one subframe set (represented by S1), while a multi-user multiplexing method based on power domain is used for the other subframe set (represented by S2). Accordingly, for S1, CSI is measured according to an existing method; for S2, it is indicated to measure the CSI according to the above power allocation information.

Or, when defining the CSI process, measuring the CSI according to an existing method or according to the above power allocation information is not limited. Instead, when indicating the CSI report, the CSI measurement type to be fed, that is, whether the CSI is measured according to an existing method or according to the above power allocation information, is further indicated. For a periodic CSI report, this information indicating the CSI measurement type is semi-statically configured by a high-layer signaling; and a for non-periodic CSI report, this information indicating the CSI measurement type can be dynamically indicated in the DCI. Or, the information about the CSI measurement type can be further indicated when configuring a CSI process corresponding to one codeword of the CSI request domain by a high-layer signaling.

The foregoing is the specific implementation of the multi-user signal transmission method in the present application. The present application further provides a multi-user signal transmission device which can be used for implementing this transmission method.

In a plurality of UEs multiplexed based on power domain, the multi-user signal transmission device, as shown in FIG. 6, includes a data receiving unit and a data decoding unit, wherein, the data receiving unit is configured to receive a scheduling signaling from a base station, and correspondingly receive a downlink data. The data decoding unit is configured to acquire control information of each interfering UE of the plurality of UEs multiplexed based on power domain other than this UE, decode data of said each interfering UE, and decode the downlink data of this UE according to the decoding result of each interfering UE.

The foregoing descriptions are merely preferred embodiments of the present invention and not intended to limit the present invention. All modifications, equivalent replacements, improvements or more made without departing from the spirit and principle of the present invention shall be regarded as falling into the protection scope of the present invention.

The invention claimed is:

1. A method by a user equipment (UE) of a plurality of user equipments (UEs) to perform a multi-user data transmission by multiplexing in a power domain, the method comprising:
   receiving, from a base station, scheduling information and downlink data associated with the scheduling information;
   acquiring, from the base station, control information associated with at least one interfering UE of the plurality of UEs other than the UE;
   decoding data for each of the at least one interfering UE in the downlink data based on the acquired control information; and
   decoding the downlink data based on the decoding result of the data for each of the at least one interfering UE,
   wherein the control information includes a rate matching parameter of the at least one interfering UE,
   wherein the rate matching parameter includes information on a transport block size (TBS) of the at least one interfering UE, and
   wherein the information on the TBS is acquired based on a modulation and coding scheme (MCS) of the at least one interfering UE, the number of physical resource blocks (PRBs) occupied by a physical downlink shared channel (PDSCH) of the at least one interfering UE, and at least one of a subframe effective length used by the at least one interfering UE and a weighting factor of the at least one interfering UE to the number of PRBs.

2. The method according to claim 1,
   wherein the number of PRBs are determined based on information associated with an enhanced physical downlink control channel (EPDCCH) of the at least one interfering UE, by determining PRBs occupied by the EPDCCH not being used for a transmission of the PDSCH of the at least one interfering UE, and
   wherein the information associated with the EPDCCH includes at least one of first information on an EPDCCH resource set of the at least one interfering UE,
   second information about on the PRBs occupied by the EPDCCH of the at least one interfering UE, or
   third information on PRBs allocated to the at least one interfering UE and used for transmitting the EPDCCH, indicated by a downlink control indicator (DCI) format.

3. The method according to claim 1, further comprising:
   acquiring information on a UE type according to an operation of the at least one interfering UE, a number of layers of spatial multiplexing supported by the at least one interfering UE, whether a modulation way of 256 quadrature amplitude modulation (QAM) is supported by the at least one interfering UE, or a parameter $K_C$ related to a number of soft buffer and the number of layers of spatial multiplexing supported by the at least one interfering UE, when the at least one interfering UE performs rate matching,
   wherein the rate matching parameter further includes a total number of bits of soft buffer of the at least one interfering UE.

4. The method according to claim 1, wherein the rate matching parameter further includes at least one of a transmission mode of the at least one interfering UE and a maximum number of downlink hybrid automatic repeat request (HARQ) processes used when the at least one interfering UE performs rate matching.

5. The method according to claim 1, wherein the control information is transmitted by semi-static configuration by a high-layer signaling, or by dynamic configuration by a physical-layer signaling; or
   wherein some of the rate matching parameter are transmitted by semi-static configuration of a high-layer signaling or by dynamic configuration of a physical-layer signaling, and the other of the rate matching parameter are preset constant values, and the other of the rate matching parameters are set by the at least one interfering UE as constant values when performing rate matching; or
   wherein a rate matching parameter of the UE is determined to be the same as the rate matching parameter of the at least one interfering UE.

6. The method according to claim 1, wherein the control information further includes layer information of multi-input multi-output (MIMO) transmission of the at least one interfering UE,
   wherein, when the at least one interfering UE uses a transmission mode based on cell-specific reference signal (CRS) demodulation, the layer information of MIMO transmission of the at least one interfering UE comprises a number of layers of the at least one interfering UE and a pre-coding matrix indicator (PMI) of each layer; and when the at least one interfering UE uses a transmission mode based on user-specific demodulation reference signal (DMRS) demodulation, the layer information of MIMO transmission of the at least one interfering UE comprises a number of layers of the at least one interfering UE or comprises the number of layers of the at least one interfering UE and corresponding DMRS port information,
   wherein, when the layer information of MIMO transmission of the at least one interfering UE is acquired, is the downlink data is decoded based on information indicated by the base station about K layers where pre-coding vectors are correspondingly equal, wherein K1 is a number of layers of the UE, K2 is the number of layers of the at least one interfering UE, and K≤min (K1,K2),
   wherein, in case that one or two transport blocks (TBs) are carried in the K layers, the layer information of MIMO transmission of the at least one interfering UE further comprises information on a number of TBs of the at least one interfering UE in the K layers, and
   wherein, when the K layers carry two TBs, a way for the at least one interfering UE is determined by the UE to divide the K layers according to indication of a pre-defined or high-layer/physical-layer signaling.

7. The method according to claim 6, further comprising:
   receiving, from the base station, information indicating K2 layers of the at least one interfering UE, when acquiring the layer information of MIMO transmission of the at least one interfering UE, and
   wherein, when the at least one interfering UE is allowed to retransmit data, the layer information of MIMO transmission of the at least one interfering UE further comprises the number of TBs carried in the K2 layers; and the number of TBs is received from the base station.

8. The method according to claim 1, wherein the control information further comprises a power parameter of the at least one interfering UE.

9. The method according to claim 8, further comprising:
receiving, from the base station, information on a signal power of the at least one interfering UE; and
determining the power parameter of the at least one interfering UE based on the information on the signal power,
wherein the power parameter is total signal power for each layer of the at least one interfering UE, or power of one layer of the at least one interfering UE, or power of one codeword of the at least one interfering UE.

10. The method according to claim 8, further comprising:
receiving, from the base station, information on a ratio of signal power of the UE and signal power of the at least one interfering UE; and
determining the power parameter of the at least one interfering UE based on the information on the ratio,
wherein the power parameter is a ratio of total signal power of the UE and total signal power of the at least one interfering UE, a ratio of power of one layer of the UE and power of one layer of the at least one interfering UE, or a ratio of power of one layer or each layer using a same pre-coding vector.

11. The method according to claim 8, wherein, when the plurality of UEs perform multiplexing on same time-frequency resources, the power parameter of the at least one interfering UE comprises total power $P_{Atotal}$ of the plurality of UEs, or total power $P_{Alayer}$ of the plurality of UEs in one layer using a same pre-coding vector, or a respective total power $P_{Anew}$ of each of the plurality of UEs.

12. The method according to claim 1, further comprising:
receiving a channel state indication-reference signal (CSI-RS) configuration signaling from the base station, and reporting a channel state indication (CSI) information based on CSI measurement according to the CSI-RS configuration to the base station, before receiving the scheduling signaling;
determining, during the CSI measurement, whether the CSI measurement of CSI process takes information of the at least one interfering UE into account based on the configuration information;
determining whether to take the information of the at least one interfering UE into account, based on CSI measurement information of one CSI process indicated in the configuration information; or
determining, when two subframe sets are configured in one CSI process, whether to take the information of the at least one interfering UE into account, based on a subframe set to which the one CSI process belongs; or
determining whether to take the information of the at least one interfering UE into account during the CSI measurement of the CSI process, based on whether a CSI report taking the information of the at least one interfering UE into account as indicated in information indicating type of the CSI measurement, and
wherein, for a periodic CSI report, the information indicating the type of CSI measurement is semi-statically configured by a high-layer signaling; and a for non-periodic CSI report, the information indicating the type of CSI measurement is dynamically indicated in a downlink control information (DCI); or wherein the information indicating the type of CSI measurement is transmitted by a high-layer signaling configuring a CSI process corresponding to a specified codeword of a CSI request field.

13. The method according to claim 12, further comprising, when it is determined that the CSI measurement takes the information of the at least one interfering UE into account, determining CSI information of the UE based on power information of each of the at least one interfering UE,
wherein the CSI information of the UE is determined by a reference PDSCH power, a reference power of a signal of the UE and a reference power of a signal of the at least one interfering UE based on a reference power ratio parameter configured by the base station,
wherein, when the plurality of UEs use a transmission mode based on CRS demodulation, a reference PDSCH power of the target UE is determined based on a power parameter and a power offset configured by a high-layer signaling,
wherein, the power parameter is total power $P_{Atotal}$ of the plurality of UEs, total power $P_{Alayer}$ of the plurality of UEs in one layer using a same pre-coding vector, or a respective total power $P_{Anew}$ of each of the plurality of UEs, and
wherein, when the plurality of UEs use a transmission mode based on DMRS demodulation, a transmission power $P_{C2}$ of the UE and a transmission power of each of the at least one interfering UE are determined based on a power parameter configured by a high-layer signaling, and a reference PDSCH power of the UE is determined, wherein $P_{C2}$ is a ratio of EPRE of one RE of a reference PDSCH and EPRE of NZP CSI-RS for CSI measurement.

14. A user equipment (UE) of a plurality of user equipments (UEs) to perform multi-user data transmission by multiplexing in power domain, the UE comprising:
a transceiver including a data receiving unit; and
a controller including a data decoding unit and configured to:
control the transceiver to receive, from a base station, scheduling information and downlink data associated with the scheduling information,
acquire, from the base station, control information associated with at least one interfering UE of the plurality of UEs other than the UE,
decode data for each of the at least one interfering UE in the downlink data based on the acquired control information, and
decode the downlink data based on the decoding result of the data for each of the at least one interfering UE,
wherein the control information includes a rate matching parameter of the at least one interfering UE,
wherein the rate matching parameter includes information on a transport block size (TBS) of the at least one interfering UE, and
wherein the information on the TBS is acquired based on a modulation and coding scheme (MCS) of the at least one interfering UE, the number of physical resource blocks (PRBs) occupied by a physical downlink shared channel (PDSCH) of the at least one interfering UE, and at least one of a subframe effective length used by the at least one interfering UE and a weighting factor of the at least one interfering UE to the number of PRBs.

* * * * *